United States Patent
Yutronkie et al.

(10) Patent No.: US 6,315,539 B1
(45) Date of Patent: Nov. 13, 2001

(54) QUICK RELEASE DEVICE FOR A TIRE MOLD PLATE

(75) Inventors: Barry Stanley Yutronkie, Kitchener; Theodore Allan Seyler, New Hamburg, both of (CA)

(73) Assignee: Michelin Rechereche et Technique S.A. (CH)

( * ) Notice: Subject to any disclaimer, the term of this patent is extended or adjusted under 35 U.S.C. 154(b) by 0 days.

(21) Appl. No.: 09/525,175

(22) Filed: Mar. 14, 2000

(51) Int. Cl.[7] ................................................. B29C 33/00
(52) U.S. Cl. ......................... 425/28.1; 249/103; 425/195
(58) Field of Search ........................... 425/28.1, 35, 195; 249/102, 103

(56) References Cited

U.S. PATENT DOCUMENTS 4,547,139  * 10/1985  Hershberger ...................... 425/195
5,939,002  *  8/1999  Heindel .............................. 425/195

* cited by examiner

Primary Examiner—James P. Mackey
(74) Attorney, Agent, or Firm—Martin Farrell; Alan A. Csontos; Robert R. Reed

(57) ABSTRACT

A mold for a tire includes a device for easily releasing a pocket plate from a recess in a side wall ring. The device includes a rod movably disposed in a hole in the mold part that extends from an outer surface to adjacent the recess. The distal end of the rod includes a cam surface wherein movement of the rod causes the cam to press on the pocket plate to urge it from the recess.

4 Claims, 4 Drawing Sheets

QUICK RELEASE DEVICE FOR A TIRE MOLD PLATE

BACKGROUND AND SUMMARY

The invention relates to molds for manufacturing new tires and molds for retreading tires. More particularly, the invention relates to a device for easily releasing a removable plate from a hot mold.

Such pocket plates are inserts for a mold side wall ring that are used to mold information onto a tire sidewall, for example, tire brand information or a bar code for inventory identification. A mold side wall ring may be used over a relatively long period of time, and for molding different versions of a single tire model. The removable plates are changed when the information on the plate needs to be changed for different tire molding requirements.

In conventional molds, pocket plates are held in place in a mold by magnets, by screws fastened from the front of the plate, or by screws fastening the plates from the back of the side wall ring. In the case of magnets, when the mold is heated, the side wall ring and plate expand, which provides friction to help hold the plate in place.

The conventional means of holding pocket plates in side wall rings present drawbacks. In molds in which the plates are fastened with front attaching screws, the screw heads leave a mark on the molded tire. When the screws are fastened from the back of the plate, the mold must be first removed from the press to gain access to the screws. Once the plate is changed, the mold must be reinstalled and realigned in the press, which involves time and effort. The magnet fastened plates must be allowed to cool before they can be removed, which causes delay, and additionally are difficult to grasp for removal because of the lack of an edge or grip on the surface of the plate.

The present invention provides a device for quickly and easily removing pocket plates from a mold. According to the invention, a mold half has a recess to receive a pocket plate. A rod inserted in a hole in a mold half part, a first end of the rod being disposed at an accessible outer surface of the mold half part, a second end of the rod disposed in a position adjacent to the pocket plate recess. The rod is movable in the hole and includes a cam surface that is selectably moved into the recess to push on the pocket plate by movement of the rod.

According to another aspect of the invention, the rod is rotatable in the hole and the cam is radially arranged on the rod for movement upon rotation. In addition, the second end include a hook radially opposite the cam surface for engaging a catch on the back surface of the pocket plate to secure the pocket plate in the recess.

According to an alternative embodiment of the invention, the rod is slidable in the hole, and the cam is linearly arranged on the second end of the rod. The rod includes a tab that engages a slot in the pocket plate to selectably secure the pocket plate in the recess.

DETAILED DESCRIPTION

Figure 1:
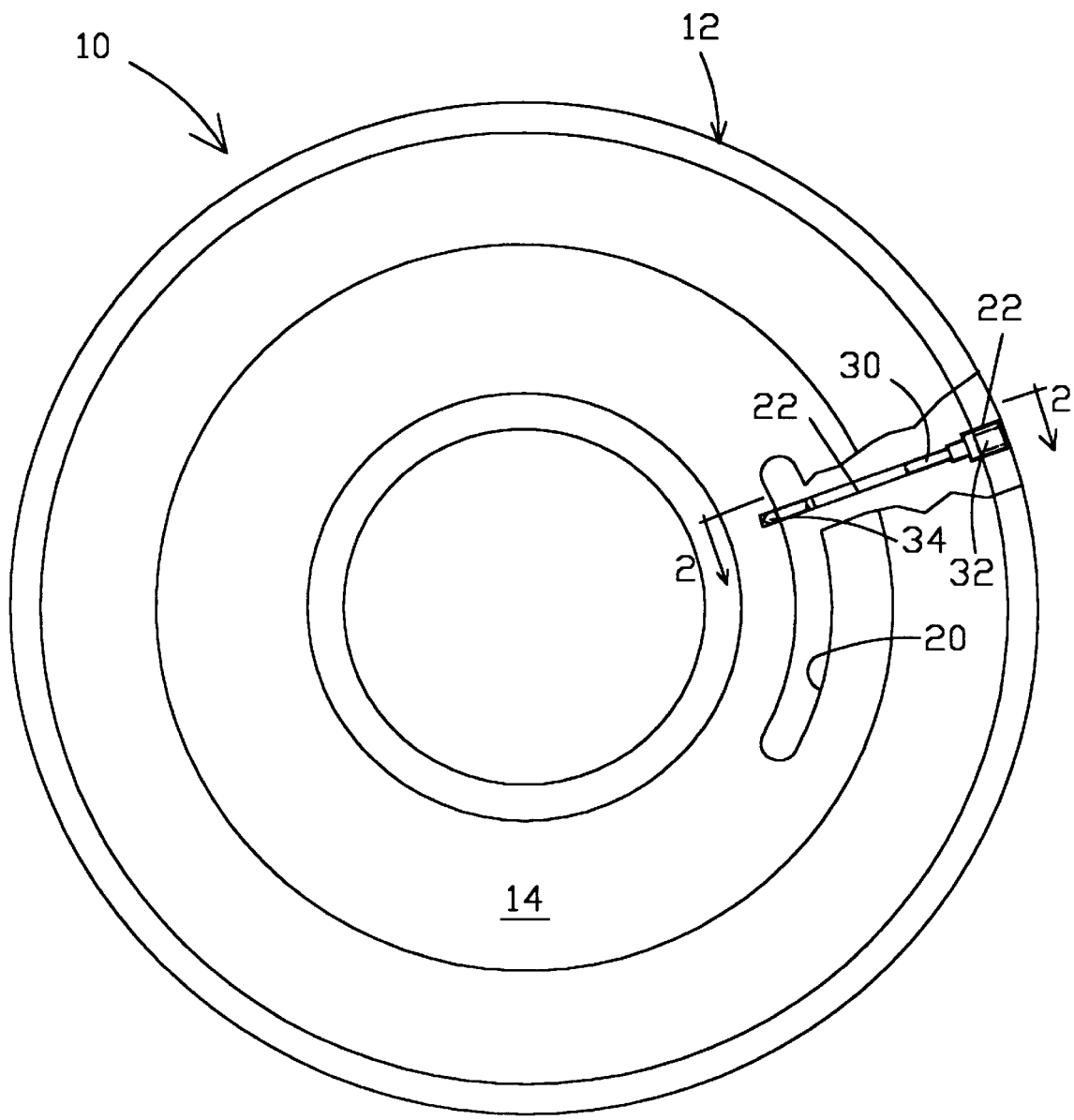
FIG. 1 is a top view of a tire mold part showing in partial section a quick release device in accordance with the invention.

FIG. 1 is a top view of tire mold part 10. As will be understood by those skilled in the art, the tire mold part 10 will contact and form one sidewall of a tire. A second mold part (not illustrated) forms the opposite sidewall, and tread forming segments (also not illustrated) are positioned in the radial direction to the two mold parts. The assembled mold parts and tread segments are placed in a press that holds the assembled parts together as they are heated to cure the tire. The drawings are not to scale, and the dimensions of various features have been exaggerated or reduced to improve the clarity of the figures.

The tire mold part 10, and the opposite mold part, include aspects that mold information and ornamental features into the tire sidewall. For example, the brand name and model of the tire, the tire size, load, and pressure specifications may be molded onto the sidewall. Some information for a given tire mold may require occasional change. For example, when the mold is used to make tires for a private label customer, the brand name will change. For such information, the mold part typically includes a removable plate (not illustrated in FIG. 1) that is inserted in a recess 20 in the mold part 10.

The invention is directed to a device to allow the quick and easy removal of such plates. In conventional molds, such plates are held in the mold by screws, either mounting from the front or rear of the plate, or by magnets. Removal of plates held by either means is awkward and time consuming.

According to the invention, a rod 30 is inserted in a hole 22 in the mold part 10. The hole 22 extends from an outer surface 12 of the mold part 10 to a position adjacent the recess 20. A first end 32 of the rod 30 is disposed at the outer surface 12 so that it may be manipulated to move the rod, as described below. A second end 34 of the rod 30 is disposed adjacent the recess 20.

The rod 30 is movable in the hole 22 to effect release of a plate in the recess 20.

Figure 2:
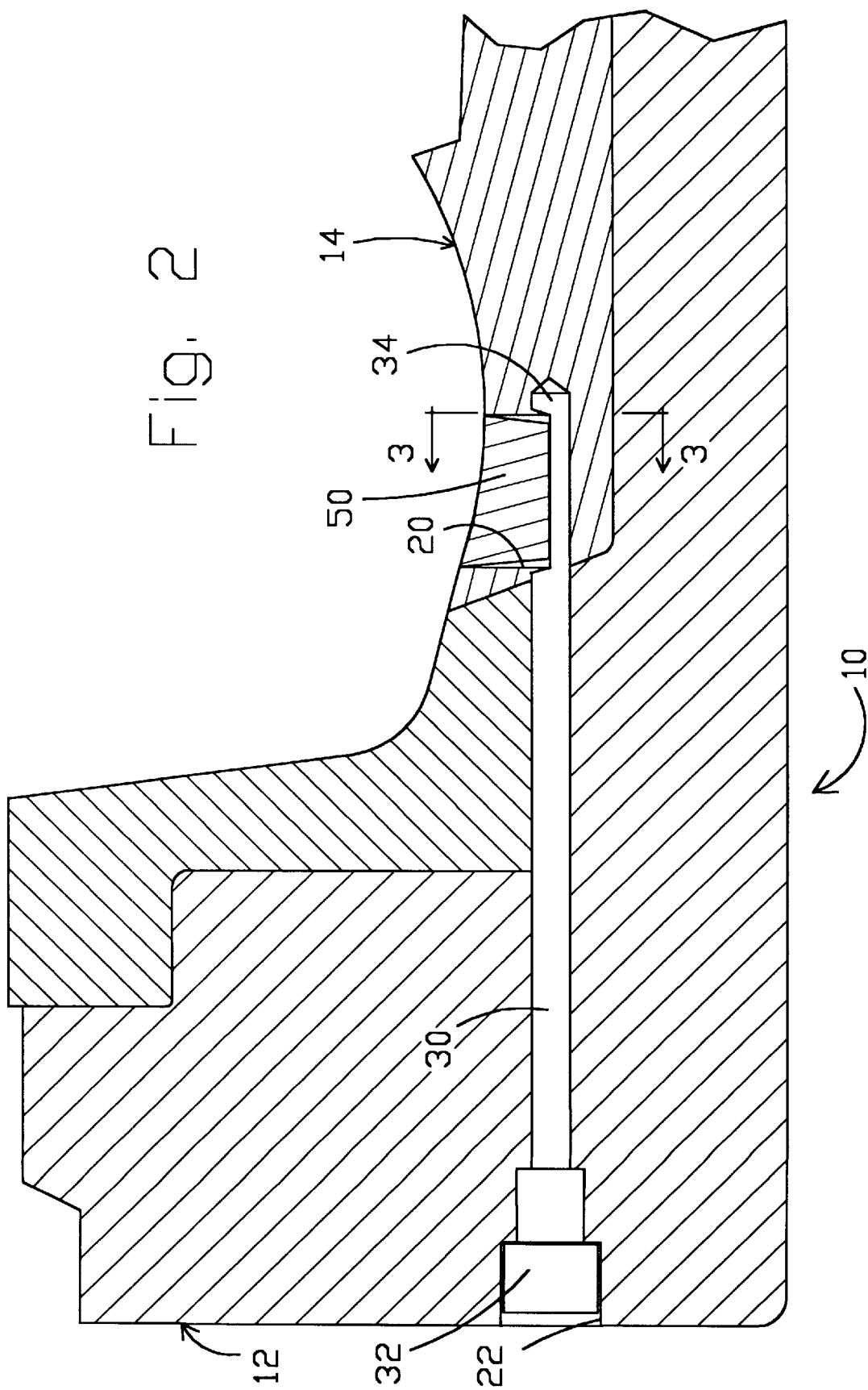
FIG. 2 is a section view of the mold part taken along the lines 2—2 in FIG. 1.

FIG. 2 is a section view of the mold part of FIG. 1 taken along the lines 2—2 in FIG. 1. A plate 50 is inserted the recess 20 in the mold part 10. In the illustrated view, the recess 20 is formed in a side wall ring 14 of the mold part 10. As may be seen, the rod 30 extends to a position adjacent the recess 20. In the embodiment illustrated in FIG. 2, the rod 30 is rotatable in the hole 22. The first end 32 of the rod 30 includes tool engaging means, a hex head hole, a slot, or other suitable structure. The second end 34 includes a cam 36, shown in FIG. 3. Turning the rod 30 causes the cam surface 36 to contact and press against the plate 50. The cam surface 36 is shaped so that it will push the plate 50 sufficiently free of the recess 20 to be removed by an operator.

Figure 3:
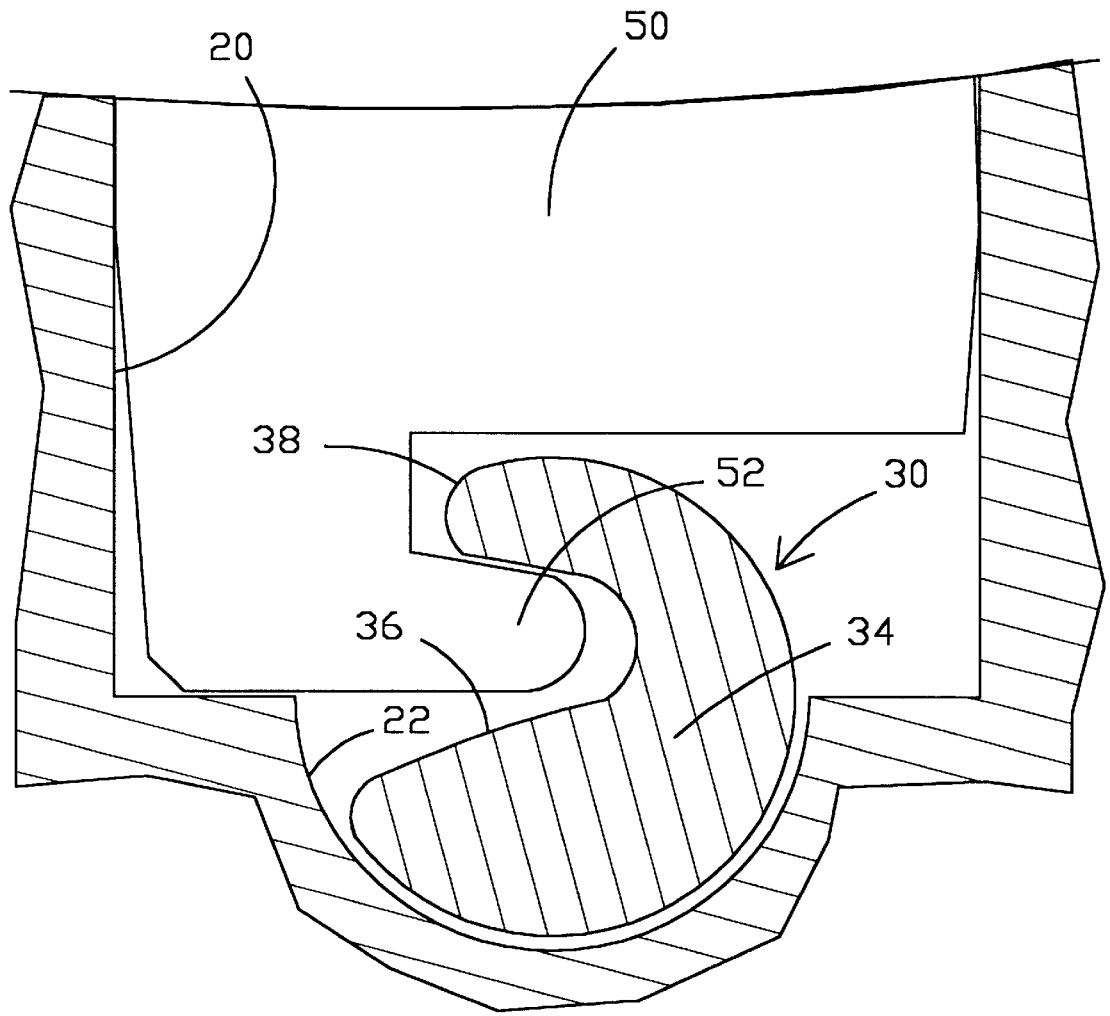
FIG. 3 is a section view of the mold part taken along the lines 3—3 in FIG. 2.

According to another aspect of the invention illustrated in FIG. 3, the second end 34 of the rod 30 includes a hook 38 oppositely disposed from the cam surface 36. The plate 50 includes a catch 52 that couples with the hook 38 when the rod 30 is rotated appropriately. The hook 38 and catch 52 serve to secure the plate in the recess 20.

Figure 4:
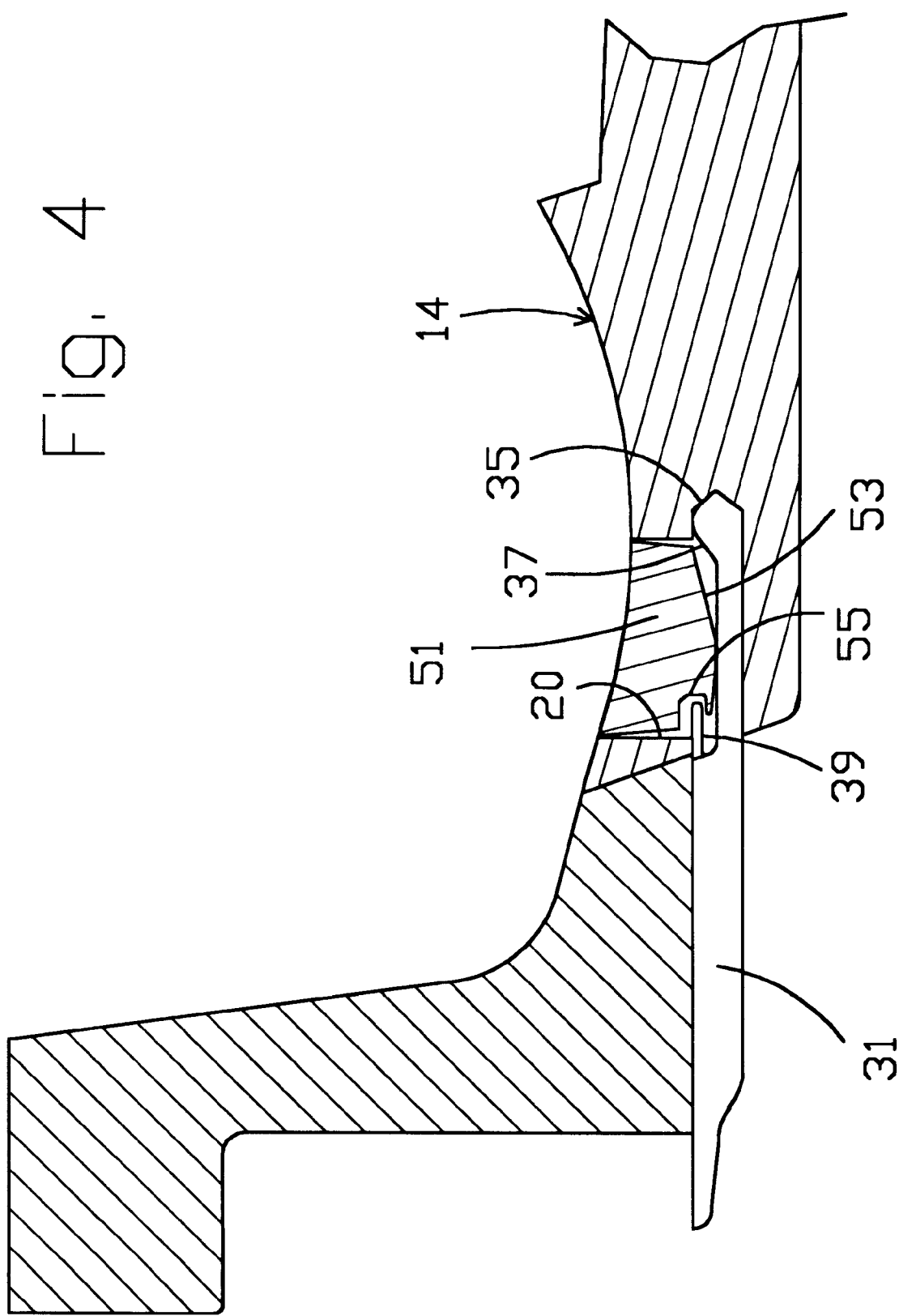
FIG. 4 is a section view according to lines 2—2 of FIG. 1 showing an alternative embodiment of the invention.

An alternative embodiment is illustrated in FIG. 4. The rod 31 is slidable in the hole in the mold part 10, and includes a linear cam 37 formed on the second end 35. By pulling the rod in the left direction in the figure, the linear cam 37 will contact and press on the bottom face 53 of the plate 51, causing it to raise out of the recess 20. The rod 31 could, of course, be arranged so that pushing, rather than pulling, causes the linear cam 37 to engage the plate 51. A spring or other device could be installed in the hole 22 to bias the rod 31 to a neutral position.

The slidable rod 31 includes a tab 39 spaced from the linear cam 35 that engages a slot 55 formed in the plate 51 when the rod is moved to a forward position to secure the plate in the recess 20.

A mold part can have as many removable plates and release devices as needed. The present invention is not limited to a particular mold type, and those skilled in the art will understand how to apply the principles of the invention to various molds. The described structures and embodiments are meant to be illustrative and not limiting, and those skilled in the art will appreciate that substitutions of equivalents may be made without departing from the scope of the inventions as defined by the following claims.

What is claimed is:

1. A device for releasing a pocket plate from a recess in a tire mold, comprising a rod insertable in a hole in a tire mold part to extend from a first end at an outer surface of the mold part to a second end at a recess for a pocket plate, the rod being movably supported in the hole, the rod having engaging means at the first end to allow selective manipulation of the rod, and having a cam surface at the second end, wherein the rod is slidable in the hole and the cam surface is linearly arranged on the rod, and wherein selective movement of the rod causes the cam surface to intrude into the recess to press on the pocket plate.

2. The release device as claimed in claim 1, the rod further comprising a tab for engaging a slot in the pocket plate to secure the pocket plate in the recess.

3. A tire mold having a pocket plate release device, comprising:
   a mold half part;
   a sidewall insert ring supported by the mold half part and having a recess for a pocket plate;
   a pocket plate releasably mounted in the recess; and
   a rod inserted through a hole extending from a radially outer surface of the mold half part to the recess, the rod being movably supported in the hole and having engaging means at a first end at the radially outer surface of the mold half part to allow selective movement of the rod and having a cam surface at a second end at the recess, wherein the rod is slidable in the hole, and wherein selective movement of the rod causes the cam surface to intrude into the recess to push the pocket plate out of the recess.

4. The tire mold as claimed in claim 3, wherein the rod includes a tab for engaging a slot in the pocket plate for securing the pocket plate in the recess.

* * * * *